United States Patent
Aliabadi et al.

(10) Patent No.: US 10,735,533 B2
(45) Date of Patent: *Aug. 4, 2020

(54) CLIENT DEVICE APPLICATION INTERACTION MONITORING

(71) Applicant: Google Inc., Mountain View, CA (US)

(72) Inventors: Roxanna Aliabadi, San Francisco, CA (US); Ajay Ananth Krishna, San Jose, CA (US); Anagha Kulkarni, Sunnyvale, CA (US); Hidetoshi Muta, Mountain View, CA (US)

(73) Assignee: Google LLC, Mountain View, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/422,250

(22) Filed: Feb. 1, 2017

(65) Prior Publication Data

US 2017/0353567 A1 Dec. 7, 2017

Related U.S. Application Data

(63) Continuation of application No. 15/171,965, filed on Jun. 2, 2016.

(51) Int. Cl.
*G06F 15/173* (2006.01)
*H04L 29/08* (2006.01)
(Continued)

(52) U.S. Cl.
CPC .......... *H04L 67/22* (2013.01); *G06F 16/9558* (2019.01); *H04L 61/306* (2013.01);
(Continued)

(58) Field of Classification Search
CPC ....... H04L 67/22; H04L 67/303; H04L 67/16; H04L 67/42; H04L 61/306; H04L 67/20;
(Continued)

(56) References Cited

U.S. PATENT DOCUMENTS 9,317,272 B2 4/2016 Chor
2008/0104031 A1 5/2008 Grasso
(Continued)

FOREIGN PATENT DOCUMENTS

WO WO-2015/183807 12/2015

OTHER PUBLICATIONS

Austin, "Technical Guide to Android Deep Linking: URI Schemes", Oct. 24, 2015, XP055387258. (7 pages).
Chung, "Auto-Tagging of Destination URLs in Bing Ads—Bing Ads", Jun. 12, 2014, XP055387264. (6 pages).
International Search Report for PCT/US17/034308 dated Jul. 31, 2017. (6 pages).
(Continued)

*Primary Examiner* — Thuong Nguyen
(74) *Attorney, Agent, or Firm* — Foley & Lardner LLP

(57) ABSTRACT

Systems and methods herein allow for automatic monitoring of conversions associated with uniform resource identifiers (URIs) accessed via client applications but actuated on web browsers. Upon actuation of a URI on a browser of a client device, a data processing system can assign a click ID to the actuation event and send it to the client device. The client device can open the URI in a client application and send the click ID and a client ID associated with the client device to the client device. The data processing system can map the click ID to the client ID. Upon occurrence of a URI related conversion, on the client application, the data processing system can receive a conversion message indicative of the conversion and including the client ID, and link the URI related conversion to the click ID based on the stored mapping.

16 Claims, 4 Drawing Sheets

(51) Int. Cl.
*G06F 16/955* (2019.01)
*H04L 29/12* (2006.01)
*H04L 29/06* (2006.01)

(52) U.S. Cl.
CPC ............ *H04L 67/02* (2013.01); *H04L 67/146* (2013.01); *H04L 67/16* (2013.01); *H04L 67/20* (2013.01); *H04L 67/28* (2013.01); *H04L 67/303* (2013.01); *H04L 67/42* (2013.01)

(58) Field of Classification Search
CPC ....... H04L 67/146; H04L 67/02; H04L 67/28; G06F 16/9558
USPC ......................... 709/224, 203, 217; 370/352
See application file for complete search history.

(56) References Cited

U.S. PATENT DOCUMENTS

| | | | |
|---|---|---|---|
| 2008/0222653 A1* | 9/2008 | Aaronson | G06F 11/3476 719/318 |
| 2008/0267167 A1* | 10/2008 | Apelqvist | H04W 8/22 370/352 |
| 2009/0197580 A1* | 8/2009 | Gupta | G06Q 30/02 455/414.2 |
| 2011/0173249 A1* | 7/2011 | Lee | H04W 72/005 709/203 |
| 2011/0238496 A1 | 9/2011 | Gurbuxani et al. | |
| 2012/0278182 A1* | 11/2012 | Kamath | G06Q 30/00 705/14.72 |
| 2013/0006743 A1 | 1/2013 | Moore et al. | |
| 2013/0111328 A1 | 5/2013 | Khanna et al. | |
| 2013/0132189 A1 | 5/2013 | St. Pierre et al. | |
| 2013/0227057 A1* | 8/2013 | Goldstein | H04L 12/1831 709/217 |
| 2015/0339274 A1* | 11/2015 | Pappu | H04N 21/4126 715/205 |
| 2015/0348094 A1 | 12/2015 | Ferber et al. | |
| 2016/0042388 A1* | 2/2016 | Chater | G06Q 30/0246 705/14.45 |
| 2016/0050167 A1 | 2/2016 | Ramachandran | |
| 2016/0119477 A1 | 4/2016 | Sharpe et al. | |
| 2017/0353561 A1 | 12/2017 | Aliabadi et al. | |
| 2017/0353563 A1* | 12/2017 | Aliabadi | H04L 61/306 |
| 2017/0353566 A1* | 12/2017 | Aliabadi | H04L 61/306 |
| 2017/0353567 A1* | 12/2017 | Aliabadi | H04L 61/306 |

OTHER PUBLICATIONS

Lakshmi, "What is URL rewriting? Does Facebook use this feature?—Quora", Feb. 29, 2016, XP055387262.
Non-Final Office Action on U.S. Appl. No. 15/171,965 dated Jun. 7, 2018.
Notification of Transmittal of the International Search Report and the Written Opinion of the International Searching Authority for PCT/US17/034308 dated Jul. 31, 2017.(1 page).
Written Opinion for PCT/US17/034308 dated Jul. 31, 2017. (12 pages).
Written Opinion of the International Preliminary Examining Authority for PCT/US2017/034308, dated May 7, 2018.
Communication pursuant to Rules 161(1) and 162 EPC for EP Application No. 17729279.4 dated Jun. 27, 2018 from European Patent Office.
The International Preliminary Report on Patentability for application No. PCT/US2017/034308 dated Aug. 21, 2018.
Final Office Action on U.S. Appl. No. 15/171,965 dated Nov. 13, 2018.
Non-Final Office Action on U.S. Appl. No. 15/171,965 dated Mar. 26, 2019.
Non-Final Office Action on U.S. Appl. No. 15/422,232 dated Jan. 7, 2019.
Non-Final Office Action on U.S. Appl. No. 15/422,269 dated Feb. 1, 2019.
Notice of Panel Decision from Pre-Appeal Brief Review for U.S. Appl. No. 15/171,965 dated Mar. 8, 2019.
Final Office Action on U.S. Appl. No. 15/422,232 dated Jun. 3, 2019.
Final Office Action on U.S. Appl. No. 15/422,269 dated Aug. 9, 2019.
Final Office Action on U.S. Appl. No. 15/171,965 dated Oct. 22, 2019 (16 pages).
Office Action on EP Appln. Serial No. 17729279.4 dated Nov. 12, 2019 (11 pages).
Non-Final Office Action on U.S. Appl. No. 15/422,232 dated Dec. 3, 2019 (17 pages).
Notice of Allowance on U.S. Appl. No. 15/171,965 dated Dec. 20, 2019 (8 pages).
Notice of Allowance for U.S. Appl. No. 15/171,965 dated May 20, 2020 (8 pages).
Notice of Allowance for U.S. Appl. No. 15/422,232 dated Apr. 10, 2020 (8 pages).
Notice of Allowance for U.S. Appl. No. 15/422,269 dated May 13, 2020 (8 pages).

* cited by examiner

CLIENT DEVICE APPLICATION INTERACTION MONITORING

CROSS-REFERENCES TO RELATED APPLICATIONS

This application claims the benefit of priority under 35 U.S.C. § 120 as a continuation of U.S. patent application Ser. No. 15/171,965 filed Jun. 2, 2016, and titled "CLIENT DEVICE APPLICATION INTERACTION MONITORING," which is incorporated by reference herein in its entirety.

BACKGROUND

A uniform resource identifier (URI) of an electronic document, such as a landing page, can be assigned to or inserted in a respective third-party content item presented on client devices. The electronic document associated with the URI can provide information related to the respective third-party content item or the third-party content provider thereof. Upon actuation of a URI, a client device can interact with the content associated with that URI, for example, by clicking interactive items therein, executing an online transaction, downloading or uploading content, actuating a video segment, or inputting text in a text field. Monitoring such client device interactions can allow third-party content providers to assess the success rate of respective third-party content items in engaging client devices.

SUMMARY

Systems and methods herein allow for automatic monitoring of interactions with content associated with uniform resource identifiers (URIs) accessed via client applications but actuated on web browsers. Upon actuation of a URI on a browser of a client device, a data processing system can assign a click ID to the actuation event and send it to the client device. The client device can open the URI in a client application and send the click ID and a client ID associated with the client device. The data processing system can map the click ID to the client ID. Upon occurrence of a URI related interaction event, on the client application, the data processing system can receive an interaction message indicative of the interaction event and including the client ID, and link the URI related interaction to the click ID based on the stored mapping.

At least one aspect relates to a system to monitor interactions with content associated with uniform resource identifiers (URIs) accessed via client applications. The system includes a data processing system having a content component, a click server, and a performance component. The content component can send, via a computer network to a client device, a third party content item and a URI for presentation on a webpage by a web browser of a client device. The URI, when actuated by the client device, causes a client application on the client device, different than the web browser, to display content associated with the URI within the client application. The click server can receive, via the computer network from the web browser of the client device, an indication of actuation of the URI by the client device, and in response, send, via the computer network to the web browser of the client device, a click identifier (ID). The performance component can receive, via the computer network from the client application, a first message including the click ID and a client identifier (ID) associated with the client device responsive to display of the content associated with the URI in the client application. The performance component can store, in a memory, a mapping between the client ID and the click ID. The performance component can receive, via the computer network from the client application, a second message indicative of an interaction event performed via the client application in association with the URI. The second message can include the client ID. The performance component can associate the interaction event to the click ID based on the second message and the mapping between the client ID and the click ID.

At least one aspect relates to a method of monitoring interactions with content associated with uniform resource identifiers (URIs) accessed via client applications. The method can include a data processing system providing, via a computer network, a third party content item and a URI for presentation with an electronic document by a web browser of a client device. The URI when actuated by the client device can cause a client application on the client device, different than the web browser, to display content associated with the URI within the client application. The method can include the data processing system receiving, via the computer network, a URI actuation event indication, from the client device, indicative of actuation of the URI by the client device. The method can include the data processing system sending, to the client device via the computer network, a click identifier (ID) responsive to receiving the URI actuation indication. The method can include the data processing system receiving, from the client device via the computer network, a first message including the click ID and a client identifier (ID) associated with the client device responsive to display of the content associated with the URI in the client application. The method can include the data processing system storing a mapping between the client ID and the click ID in a memory. The method can include the data processing system receiving, via the computer network, a second message indicative of an interaction event performed via the client application in association with the URI. The second message can include the client ID. The method can also include the data processing system associating the interaction event to the click ID based on the second message and the mapping between the client ID and the click ID.

At least one aspect relates to a non-transitory computer-readable medium including computer code instructions thereon. The computer code instructions, when executed by one or more processors of data processing system, can cause the data processing system to perform a method of monitoring interactions with content associated with uniform resource identifiers (URIs) accessed via client applications. The method can include providing, via a computer network, a third party content item and a URI for presentation with an electronic document by a web browser of a client device. The URI when actuated by the client device can cause a client application on the client device, different than the web browser, to display content associated with the URI within the client application. The method can include receiving, via the computer network, a URI actuation event indication, from the client device, indicative of actuation of the URI by the client device. The method can include sending, to the client device via the computer network, a click identifier (ID) responsive to receiving the URI actuation indication. The method can include receiving, from the client device via the computer network, a first message including the click ID and a client identifier (ID) of the third-party content item responsive to display of the content associated with the URI in the client application. The method can include storing a mapping between the client ID and the click ID in a memory. The method can include receiving, via the computer network, a second message indicative of an interaction event performed via the client application in association with the URI. The second message can include the client ID. The method can also include associating the interaction event to the click ID based on the second message and the mapping between the client ID and the click ID.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
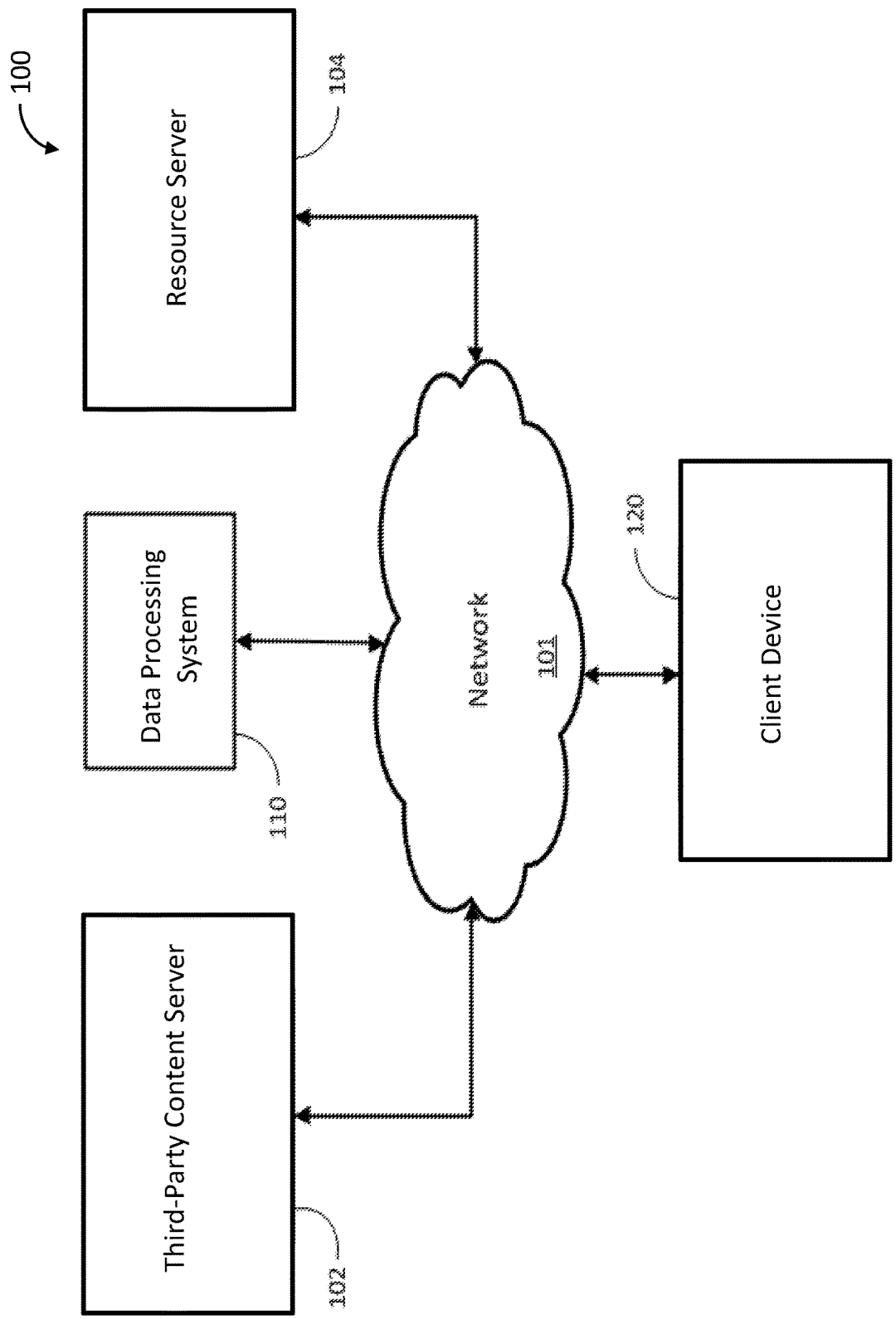
FIG. 1 is an overview depicting an implementation of a system of providing information via a computer network.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for monitoring web-to-app content interactions (or conversions). Web-to-app content interactions relate to interactions with third-party content that is displayed within a client application responsive to actuation of a respective uniform resource identifier (URI) on a web browser. The various concepts introduced above and discussed in greater detail below may be implemented in any of numerous ways as the described concepts are not limited to any particular manner of implementation. Examples of specific implementations and applications are provided primarily for illustrative purposes.

Monitoring web-to-app content interactions in a computer environment poses many technical challenges. Web-to-app content interactions are interaction (or conversion) events associated with uniform resource identifiers (URIs) that are actuated on a web browser, but opened, in response to the actuation, within a client application. The difference between the actuation platform (e.g., the web browser) and the interaction (or conversion) platform (e.g., the client application), in terms of in the respective software modules and data structures, calls for new content interaction monitoring techniques. For example, a web browser and a client application running on a client device may not be configured to share or exchange respective stateful information or respective execution events.

Third-party content providers provide third-party content for display on client devices seeking to engage users of such devices to perform an interaction event. An interaction event (or conversion event) associated with a displayed third-party content item can include purchasing a product item, purchasing a service, participating in an online game, signing up for a service, making a donation (such as a donation for a non-profit organization or a political campaign), filling a survey, accessing a webpage, or a combination thereof. Third-party content items, such as ads, can include (or be displayed with) uniform resource identifiers (URIs) representing links to additional content (or landing pages). The additional content can be associated, for example, with products or services associated with a third-party content provider. A client device can display additional content associated with a URI displayed, for example, with a third-party content item responsive to actuation of the URI.

The client device can display content associated with a URI on a web browser or within a client application that is different than a web browser and that resides on the client device. For instance, some operating systems can support universal links. As such, a client device supporting such operating systems can open a hypertext transfer protocol (HTTP) uniform resource locator (URL), for example, in web browser or within a client application residing on the client device. When a URI (or URL) is displayed with a third-party content item on a web browser, displaying the content associated with that URI within a client application, upon actuation of the URI, poses a technical challenge with regard to monitoring any interaction event associated with the URI occurring within the client application.

Third-party content providers seek to monitor interaction events (e.g., ad conversions) in association with respective URIs. Such monitoring allows for reliable and objective evaluation of success rates of various third-party content items and respective URIs. An interaction event can include an online purchase of a product or service associated with the third-party content provider, executing an online subscription, making a donation online, filling in an online survey, downloading an electronic file, participating in an electronic game, or a combination thereof. Monitoring interaction events can include a data processing system receiving, from client devices, information indicative of interaction events as they occur and mapping such interaction events with corresponding URIs.

Web-to-Web interaction event monitoring mechanisms can evaluate URIs opened within a web browser. Upon a client device actuating a URI displayed on a web browser, the data processing system can send a data block to the client device to obtain information indicative of client device interaction with content displayed on the web browser. When an interaction event is executed on the web browser, an interaction event detection module (e.g., running within the browser) can cause the client device to send the data block to the data processing system. The data processing system can scan the received data block and extract information indicative of the interaction event executed on the web browser. In this example, the data processing system can monitor each web-to-web interaction event where the URI associated with a third-party content item is displayed on a web browser and the respective content is also displayed on the web browser upon actuation of the URI.

For a web-to-app interaction event where the URI is displayed on the web browser, with the respective third-party content item, but the content associated with the URI is displayed on a client application responsive to actuation of the URI, the use of a data block and the interaction event detection module may not be adequate for monitoring interaction events occurring within the client application. The interaction event detection module, when executed by the client device, can cause the client device to detect interaction events occurring on the browser but not conversions occurring within the client application. Furthermore, for many client applications, data blocks may not be an adequate tool to record client device interaction with content displayed via the client application. Accordingly, web-to-web interaction event monitoring technology may not be adequate for monitoring web-to-app interaction events.

Client applications can report interaction events by sending conversion messages (or conversion pings) to the data processing system or to a remote server. The messages can include any information indicative of the URIs at the origin of any interaction events. At least one technical challenge from the data processing perspective relates to how to map reported interaction events to respective URIs. Also, different client applications can report interaction events differently. For instance, the type, the format, or the content of messages used to report interaction events can differ from one client application to another. The variation in such messages imposes another technical challenge. For example, web-to-app interaction event monitoring solutions are desired to support various conversion pings associated with distinct client applications.

At least one technical solution described herein provides a data processing system that can automatically and reliably monitor web-to-app interaction events in association with respective URIs. Web-to-app interaction events monitoring processes performed by the data processing system are independent of underlying interaction events reporting models employed by various third-party content providers. For example, web-to-app interaction event monitoring processes can decouple the mechanism to link interaction events to respective URIs (or respective URI actuation events) from the conversion pings employed by client applications. This mechanism can be referred to herein as the click linking mechanism. The decoupling of click linking mechanism from the conversion pings allows for supporting various conversion pings, e.g., associated with distinct client applications.

Responsive to receiving a search query or a request for a third-party content item, the data processing system can provide one or more URIs for display on a client device with a selected third-party content item or a selected set of search result items. The URI(s) can open, upon actuation by the client device, within a client application residing on the client device. Upon the client device actuating a URI of the one or more URI(s), the data processing system can receive an indication of such actuation. For instance, the client device can send the URI to the data processing system upon actuation of the URI.

In response to the received indication, the data processing system can determine (or assign) a click ID to the URI. The click ID can be viewed as an identifier of the URI actuation event on the client device. The data processing system can store a mapping between click ID and the URI or a mapping between the click ID and a conversion ID. The conversion ID can be indicative of a type of interaction event associated with the URI. The data processing system can then send the click ID to the client device. For instance, the data processing system can append the URI with the click ID and send the appended URI to the web browser on the client device.

Upon receiving the click ID, the client device (or the browser therein) can cause the URI to be opened within the client application. In particular, the client device can cause the content associated with the URI to be displayed within the client application (e.g., if installed on the client device). Opening the URI within the client application can include the client device initiating the client application. The client application (or the client device) can determine a client ID (or device ID) associated with (or identifying) the client device. Responsive to displaying the content associated with the URI, the client application can send a first message to the data processing system including the click ID and the client ID. The first message is indicative of displaying the content associated with the URI within the client application.

Upon receiving the first message, the data processing system can extract the click ID and the client ID, and store a mapping between the click ID and the client ID. Such mapping allows the data processing system to link interaction events executed within the client application associated with the URI. In particular, upon the client device executing an interaction event within the client application in association with the URI, the client application (or a software development kit (SDK) running on the client device) can cause the client device to send a second message indicative of the interaction event to the data processing system. The second message can include the client ID. The second message can further include a conversion ID, for example, indicative of an interaction event type, a time stamp indicative of the time of occurrence of the conversion, an application ID identifying the client application (or type thereof), or a combination thereof. Upon receiving the second message, the data processing system can identify (or extract) the parameters embedded within the second messages. The data processing system can use the client ID embedded in the second message and the stored mapping between the click ID and the client ID to link the interaction event to the click ID.

The use of both the first and second messages transmitted by the client device to the data processing system, instead of a single conversion ping, allow the data processing system to monitor web-to-app interaction events and associate such interaction events to respective URI actuation events. Furthermore, the use of the first and second messages allows the data processing system to distinguish interaction events executed within client application from interaction events executed on web pages (associated with respective URIs) where only conversion pings are used. Upon linking a reported interaction event to a respective click ID, the data processing system can report such interaction event the third-party content provider associated with the third-party content item and the actuated URI.

Systems and methods to monitor interaction events associated with uniform resource identifiers (URIs) accessed via client applications include a data processing system providing, via a computer network, a third party content item and a URI for presentation on a webpage by a web browser of a client device. The URI when actuated by the client device can cause a client application on the client device, different than the web browser, to display content associated with the URI within the client application. The data processing system can receive, via the computer network from the web browser of the client device, an indication of actuating the URI by the client device, and send to the web browser of the client device a click identifier (ID) responsive to receiving the indication of actuating the URI by the client device. The data processing system can receive from the client application a first message including a client identifier (ID) associated with the client device and the click ID responsive to display of the content associated with the URI in the client application, and store a mapping between the client ID and the click ID in a memory. Upon performance of a interaction event within the client application in association with the URI, the data processing system can receive from the client application a second message indicative of such interaction event. The second message includes at least the client ID. The data processing system can associate the interaction event to the click ID based on the second message including the client ID and the mapping between the client ID and the click ID stored in memory.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an implementation of a system 100 for providing information via at least one computer network such as the network 101. The network 101 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 110. The data processing system 110 can include at least one logic device, such as a computing device having a data processor, to communicate via the network 101, for example with a resource server 104, a client device 120, or a third-party content server 102. The data processing system 110 can include one or more data processors, such as a content placement processor, configured to execute instructions stored in a memory device to perform one or more operations described herein. In other words, the one or more data processors and the memory device of the data processing system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language. The processor may process instructions and output data to effect presentation of one or more content items to the resource server 104 or the client device 120. In addition to the processing circuit, the data processing system 110 may include one or more databases configured to store data. The content item selection system 110 may also include an interface configured to receive data via the network 101 and to provide data from the data processing system 110 to any of the other devices on the network 101. The data processing system 110 can include a server, such as an ad server or otherwise.

The client device 120 can include one or more devices such as a computer, laptop, desktop, smart phone, tablet, personal digital assistant, set-top box for a television set, a smart television, or server device configured to communicate with other devices via the network 101. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 120 can execute a software application (e.g., a web browser or other application) to retrieve content from other computing devices over the network 101. Such an application may be configured to retrieve first-party content from a resource server 104. An application running on the client device 120 may itself be first-party content (e.g., a game, a media player, etc.). The client device 120 can execute a web browser application that provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 120 executing the instructions from the web browser application may request data from another device connected to the network 101 referred to by the URL address (e.g., a resource server 104). The other device may then provide web page data, geographic map data, or other data to the client device 120, which causes visual indicia to be displayed by the display of the client device 120. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, geographic map data, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. The client device 120 can access the resource server 104 via the network 101 to request data to effect presentation of a resource of the resource server 104.

One or more third-party content providers may have third-party content servers 102 to directly or indirectly provide data for third-party content items to the data processing system 110 or to other computing devices via network 101. The content items may be in any format that may be presented on a display of a client device 120, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the data processing system 110 or the data for the third-party content items may be stored in a database of the data processing system 110.

The data processing system 110 can receive, via the network 101, a request for a content item to present with a resource. The request may be received from a resource server 104, a client device 120, or any other computing device. The resource server 104 may be owned or ran by a first-party content provider that may include instructions for the data processing system 110 to provide third-party content items with one or more resources of the first-party content provider on the resource server 104. The resource can include a web page, or geographic map data. The client device 120 can be a computing device operated by a user (represented by an anonymous device identifier), which, when accessing a resource of the resource server 104, can make a request to the data processing system 110 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the data processing system 110 receives can include a HyperText Transfer Protocol (HTTP) cookie or other data block that contains a device identifier (e.g., a random or pseudo random number) that represents the client device 120. The device information or the resource information may be appended to a content item request URL (e.g., contentitem.item/page/contentitem?devid=abc123&devnfo=A34r0). The device information or the resource information may be encoded prior to being appended the content item request URL. The requesting device information or the resource information may be utilized by the data processing system 110 to select third-party content items to be served with the requested resource and presented on a display of a client device 120.

A resource of a resource server 104 can include a search engine feature. The search engine feature can receive a search query (e.g., a string of text) via an input feature (an input text box, etc.). The search engine can search an index of documents (e.g., other resources, such as web pages, etc.) for relevant search results based on the search query. The search results can be transmitted as a second resource to present the relevant search results, such as a search result web page, on a display of a client device 120. The search results can include, for example, web page titles, or hyperlinks. One or more third-party content items can be presented with the search results in a content item slot of the search result web page. Accordingly, the resource server 104 or the client device 120 can request one or more content items from the data processing system 110 to be presented in the content item slot of the search result web page. The content item request can include additional information, such as the user device information, the resource information, a quantity of content items, a format for the content items, the search query string, keywords of the search query string, information related to the query (e.g., geographic location information or temporal information). The resource server(s) 104 (or the data processing system 110) can make a delineation between the search results and the third-party content items to avert confusion. For example, the resource server(s) 104 (or the data processing system 110) can specify the display areas for both the search results and the third-party content items on web browser.

The third-party content server(s) 102 can manage the selection and serving of content items by the data processing system 110. For example, the third-party content server(s) 102 may set bid values or selection criteria via a user interface that may include one or more content item conditions or constraints regarding the serving of content items. A third-party content server 102 can specify that a content item or a set of content items are to be selected and served for user devices 120 having device identifiers associated with a certain geographic location or region, a certain language, a certain operating system, or a certain web browser for example. The third-party content provider can specify that a content item or set of content items are to be selected and served when the resource, such as a web page, document, etc., contains content that matches or is related to certain keywords, phrases, etc. The third-party content server 102 can set a single bid value for several content items, set bid values for subsets of content items, or set bid values for each content item. The third-party content provider may also set the types of bid values, such as bids based on whether a user clicks on the third-party content item, whether a user performs a specific action based on the presentation of the third-party content item, whether the third-party content item is selected and served, or other types of bids.

Figure 2:
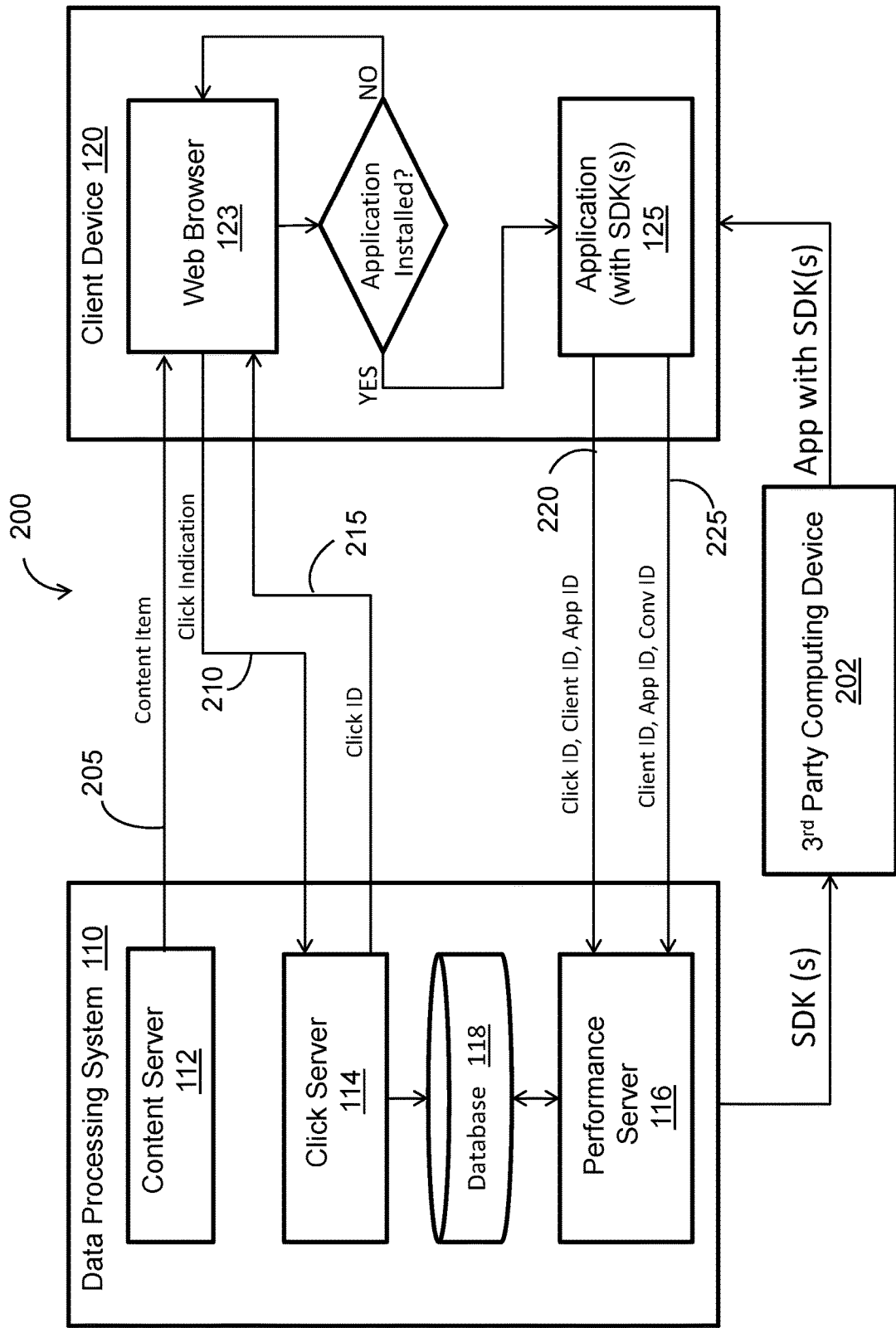
FIG. 2 shows a diagram illustrating a computer environment for monitoring web-to-app conversions (or interactions) in association with respect uniform resource identifiers (URIs)

FIG. 2 shows a diagram illustrating a computer environment 200 for monitoring web-to-app conversions (or interactions) in association with respect uniform resource identifiers (URIs). The computer environment 200 can include a data processing system 110, a client device 120, and computing device 202 associated with a third-party content provider. The data processing system 110, the client device 120, and the computing device 202 can be communicatively coupled via the communications network 101 (shown in FIG. 1). The data processing system 110 can include a content server (or content component) 112, a click server 114, a performance server (or performance component) 116, and a database 118. The client device 120 can include a web browser 123 and a client application 125 different than the web browser. While FIG. 2 shows a single client device 120, in general, the computer environment 200 can include a plurality of client devices 120 communicatively coupled to the data processing system 110, for example, via the communications network 101 (shown in FIG. 1). The content server 112, the click server 114, and the performance server 116 can be implemented as (or on) separate computing devices. In some instances, software (or hardware) modules associated with various servers among the content server 112, the click server 114, and the performance server 116 can be implemented on a single computing device.

The data processing system 110 can include a content server (or content component) 112. The content server can be a separate computing device (such as a hardware server) or a software module executable by on one or more computing devices. In general, the content server 112 can include a software module, a hardware module, or a combination of software and hardware modules. The data processing system 110 can include a plurality of content servers 112. The content server 112 can be configured to select and provide third-party content for presentation on client devices 120. For example, the content server 112 can receive a request for a third-party content item for presentation on the client device 120. In response to the request, the content server 112 can select a third-party content item for sending to the client device 120. The selected third-party content item can include (or be associated with) a URI. For example, the data processing system 110 can provide a user interface to each third-party content provider to assign one or more URIs to each respective third-party content item. In some instances, the content server 112 can also select a URI for providing with the third-party content item. The URI can be, for example, a uniform resource locator (URL) or an address of a landing page. The content server 112 can send the third-party content item 205 to the web browser 123 of the client device 120 for display thereon.

The browser 123 can display the third-party content item 205 (together with the URI) within an electronic document (or a webpage), for example. Upon the client device 120 actuating the URI on the browser 123, the browser 123 can cause the client device 120 to send a URI actuation event indication 210 to the data processing system 110. The URI actuation event indication 210 is indicative of the actuation of the URI on the client device 120. The URI actuation event indication 210 can be a request for the content associated with the URI directed to the data processing system 110. The URI actuation event indication 210 can include the actuated URI.

The click server 114 can be configured to monitor actuation of URIs on client devices 120. The click server 114 can receive the URI actuation indication 210, and assign a click identifier (ID) 215 to the URI actuation event. The click ID 215 identifies the event of actuating the URI on the client device 120. The click ID 215 can be a number or a string of characters. In some instances, the click server 114 can store a mapping between the click ID 215 and the URI in the database 118. In some instances, the click server 114 can store a mapping between the click ID 215 and a conversion ID. The conversion ID can be indicative of a type of conversion associated with the URI. The type of conversion can include, for example, an online transaction, download/upload of an electronic file, filling an electronic survey, executing an online donation, actuating an electronic game, playing a video segment, or actuating an icon associated with the content accessible via the URI.

In response to receiving the URI actuation indication, the click server 114 can send the click ID 215 to the browser 123 of the client device 120. For instance, the click server 114 can append the URI with the click ID 215 and send the appended URI to the web browser 123. An illustrative example of a URI appended with a click ID 215 (e.g., gclid) can be as follows: http://www.nay.sk/?pty=specials&gclid=CjwKEAjwgMieBRCB3bqB94e9 1D4SJABW3sTNdbig 18T3Prh00pPhbuGlzhOgLqc7JBy_b0lwxcK_PRoCgG7 w_wcB. Another illustrative example of a URI appended with a click ID 215 can be myapp://product=124&referrer=gclid %3D123. In this example, the click ID 215 can be embedded as part of a parameter (e.g., "referrer") within the URI. For instance the click server 114 can append the URI with the parameter (e.g., "referrer") including the click ID. In some instances, the click server can check the account settings of the third-party content provider associated with the third-party content item 205. If a setting parameter "auto-tagging" is enabled, the click server 114 can automatically append the URI with the click ID 215. By enabling auto-tagging, a third-party content provider can enable content associated with one or more URIs to be displayed on a respective client application that is installed on client devices 120. In some instances, the click server 114 can send the click ID 215 to the web browser 123 as a separate parameter, for example, within a message. Upon receiving the click ID 215 or the appended URI, the web browser 123 (or the client device 120) can cause the application 125 to display the content associated with the URI. A processor of the client device can check whether the client application 125 is installed on the client device 120 before the web browser 123 forwards the URI to that client application 125. If the client application 125 is not installed on the client device 120, the processor of the client device can cause the content associated with the URI to be displayed on the web browser 123. In some instances, forwarding the URI (e.g., the appended URI) can include the processor of the client device initiating the client application 125 on the client device 120.

The data processing system 110 can provide one or more SDKs (or software modules) to the computing device 202 of the third-party content provider for integrating with the client application. The software module(s), when executed by the client device 120, can cause the application 125 to send a first message 220 (also referred to as "connect ping") to the performance server 116 in response to opening the URI within the client application 125. For example, the software module(s) can include a "restorationHandler" function for integration within the "appDelegate" class associated with the client application 125. This function, when executed by the processor of the client device, can cause the client device 120 to check if an activity type (e.g., associated with the activity of opening the URI with the client application 125) corresponds to an application program interface (API) indicative of a deep linking activity into the client application 125 via a universal link (or display of the URI content within the client application 125). The software module(s) (or SDK(s)), when executed by the processor of the client device 120, can further cause the client device 120 to extract the click ID 215 from the appended URI, for example, upon determining that the activity is a deep linking activity into the client application 125. The software module(s) (or SDK(s)), when executed by the processor of the client device, can also cause the client device 120 to send the first message 220 to the performance server 116.

The first message 220 can include at least the click ID 215 and a client ID. The client ID can be associated with or identify the client device 120. The first message 220 can include an application identifier (ID) associated with (or identifying) the client application 125. The client application 125 (or the SDK(s) provided by the data processing system 110) can be configured, when executed by the processor of the client device, to cause the client device 120 to determine the client ID (or device ID). For example, the client device 120 can retrieve the client ID from a memory associated with the client device. An example of the first message 220 can be as follows:

```
https://www.googleadservices.com/pagead/conversion/app/connect/
<App_id>/
        ?app_event_type=deep_link
        &idtype=AdID // client ID type
        &rdid=<AdID> // client ID
        &sdkversion=<sdk_version> // <company>-i-v<1.2.3>
        &gclid=<abcd>  // click ID
        &retry=1 // only present if this is a retry URL
```

As illustrated in this example, the first message 220 can further include other parameters such as, an indication of the message type (e.g., connect ping), an application ID (e.g., <App_id>), an indication of the activity type (e.g., deep linking activity in the client application 125), an indication of the SDK(s) version, and an indication of whether the process of displaying the content associated with the URI within the client application 125 is a re-try attempt. In some instances, the first message can include any combination of these parameters. The application ID can identify the client application 125.

By providing the SDK(s) to cause the client device 120 to send the first message 220 responsive to display of the content associated within the actuated URI within the client application 125, the data processing system 110 can be able to link the client ID to the click ID 215 based on the information received within the first message 220. Since conversion messages (for reporting conversion events) employed by third-party content providers usually include the client ID, the mapping (or linking) of the client ID to click ID 215 (based on information received within the first message 215) enables the data processing system 110 to link conversion events (or interaction events) associated with the content of the URI displayed within the client application 125 to the URI actuation event (and therefore to the URI) executed on the client device 120.

The performance server 116 can be configured to receive the first message 220 and store a mapping between the click ID 215 and the client ID (based on information received within the first message 220) in the database 108. For instance, the performance server 116 can scan the first message 220 received from the client application 125 and extract parameters therefrom including the click ID 215 and the client ID. The performance server 116 can store, in the database 118, a data structure (such as a table column/row or a linked list) associating the extracted click ID to the extracted client ID. The data structure can include other parameters extracted from the received first message 220, such as the application ID. The data structure can also associate the application ID to the click ID. Storing the parameters extracted from the first message 220 (including the mapping between the click ID 215 and the client ID) can include the performance server 116 encrypting the click ID 215, the client ID, the application ID, other parameters, or a combination thereof, and storing the encrypted parameter(s). Storing the parameter(s) in encrypted form enhances the security of the system and the privacy of such data. In some instances, scanning the first message 220 can include the performance server 116 validating the received first message 220. For instance, the performance server 116 can check (within the received first message 220) for the message type and/or one or more other parameters to determine the validity of the received message as a "connect ping."

Upon a conversion (or interaction) event occurring within the client application 125 in relation with the content of the URI, the client application 125 (or the SDK(s)) can cause the client device 120 to send a second message (or conversion message) 225 to the performance server 116. The conversion message 225 can include the client ID, a conversion ID (e.g., indicative of the type of conversion or type of interaction event type performed within the client application 125), application ID identifying the client application 125 (or a type thereof), conversion transaction information (or parameters such as transaction amount), timestamp indicative of the time of occurrence of the conversion, or a combination thereof.

In response to receipt of the second message 225, the performance server 116 can be configured to identify the click ID (or the URI actuation event) associated with conversion indicated within the second message 225. For instance, the performance server 116 can extract the client ID from the second message 225 and determine the corresponding click ID by matching the extracted client ID to the client ID stored in the database 118 and associated with (or mapped to) the click ID 215. Upon determining the click ID 215 corresponding to the conversion event indicated within the second message 225, the performance server 116 can store the conversion parameters (such as the application ID, the timestamp indicative of the conversion occurrence time, and/or the conversion transaction information) received within the second message 225 in the database 118 in association with the determined click ID 215. Identifying (or determining) a click ID corresponding to a received conversion message (such as the second message 225) can be indicative of a web-to-app conversion. In some instances, if no click ID is determined as corresponding to a received conversion message, then the conversion message can be interpreted, for example, as indicative of a web-to-web conversion.

In some implementations, the client application 125 (or the SDK(s)) can cause the client device 120, upon receiving the click ID 215, to store the click ID 215 in a data cache associated with the client application 125. According to these implementations, the client device 120 (or the client application 125 with the SDK(s)) can omit sending the first message 220 to the performance server 116. Instead, responsive to a conversion (or interaction) event, the client application 125 (or the SDK(s)) can cause the client device 120 to retrieve click ID 215 from the data cache and send the click ID 215 within the second message 225, for example, with the client ID, the application ID, the conversion ID, the timestamp, or a combination thereof.

Based on the determined click ID 215, the performance server 116 can also compare the conversion ID received within the second message 225 to the conversion ID mapped to the click ID 215 within the database 118. Based on this comparison, the performance server 116 can determine the validity (or authenticity) of the second message 225 (or the conversion indicated therein). For example, the performance server 116 can be configured to store the conversion parameters if a match between the conversion ID received within the second message 225 and the conversion ID mapped to the click ID 215 stored within the database 118 is determined. In some instances, the performance server 116 can be configured to update maintained conversion statistics (or performance statistics) associated with the third-party content item 205, the URI presented with the third-party content item 205, the client application 125, or the client device 120 based on the information received within the second message 225.

In some instances, the performance server 116 can be configured to receive the second message 225 via a computer device associated with the third-party content provider (such as the third-party content server 102 or the computing device 202). The performance server 116 can be configured to send, responsive to receipt of the second message 225, URI actuation event information (such as the click ID 215, the URI, the conversion ID stored in the database 118, a timestamp indicative of time of actuating the URI on the web browser 123, or a combination thereof). The performance server 116 can send the URI actuation information in the form of a URL. A template of the URL including the URI actuation information can be pre-defined. Sending the URI actuation information to the computer device associated with the third-party content provider includes identifying a click ID associated with the received second message 225 (as described above), and retrieving, based on the identified click ID, one or more parameters (such as the click ID 215, the URI, the conversion ID stored in the database 118, a timestamp indicative of time of actuating the URI on the web browser 123, or a combination thereof) from the database 118 for sending to the to the computer device associated with the third-party content provider.

In some instances, the performance server 116 can forward the URI actuation event information to the click server 114 for sending to the computer device associated with the third-party content provider. For example, the click server 114 can be configured to ping the performance server 116 for URI actuation event information. In response, the performance server 116 can check for any reported conversion event(s) (e.g., check for any received conversion message(s) 220), and upon determining a received conversion message 220, the performance server 116 can respond to the click server 114 by sending the corresponding URI actuation event information (e.g., a URL including the click ID 215, the URI, the conversion ID stored in the database 118, a timestamp indicative of time of actuating the URI on the web browser 123, or a combination thereof).

In some instances, the performance server 116 can receive the second message 225 from the client device 120 (or the web browser 123). In these instances, the performance server 116 can be configured to report, responsive to receiving the second message 225, a combination of conversion parameters (e.g., from the second message 225) and URI actuation event parameters (e.g., retrieved from the database 118) to a computer device of the third party content provider (such as the third-party content server 102 or the computing device 202). The performance server 116 can be configured to send the combination of conversion parameters and URI actuation event parameters to the computer device of the third party content provider in the form of a URL.

Figure 3:
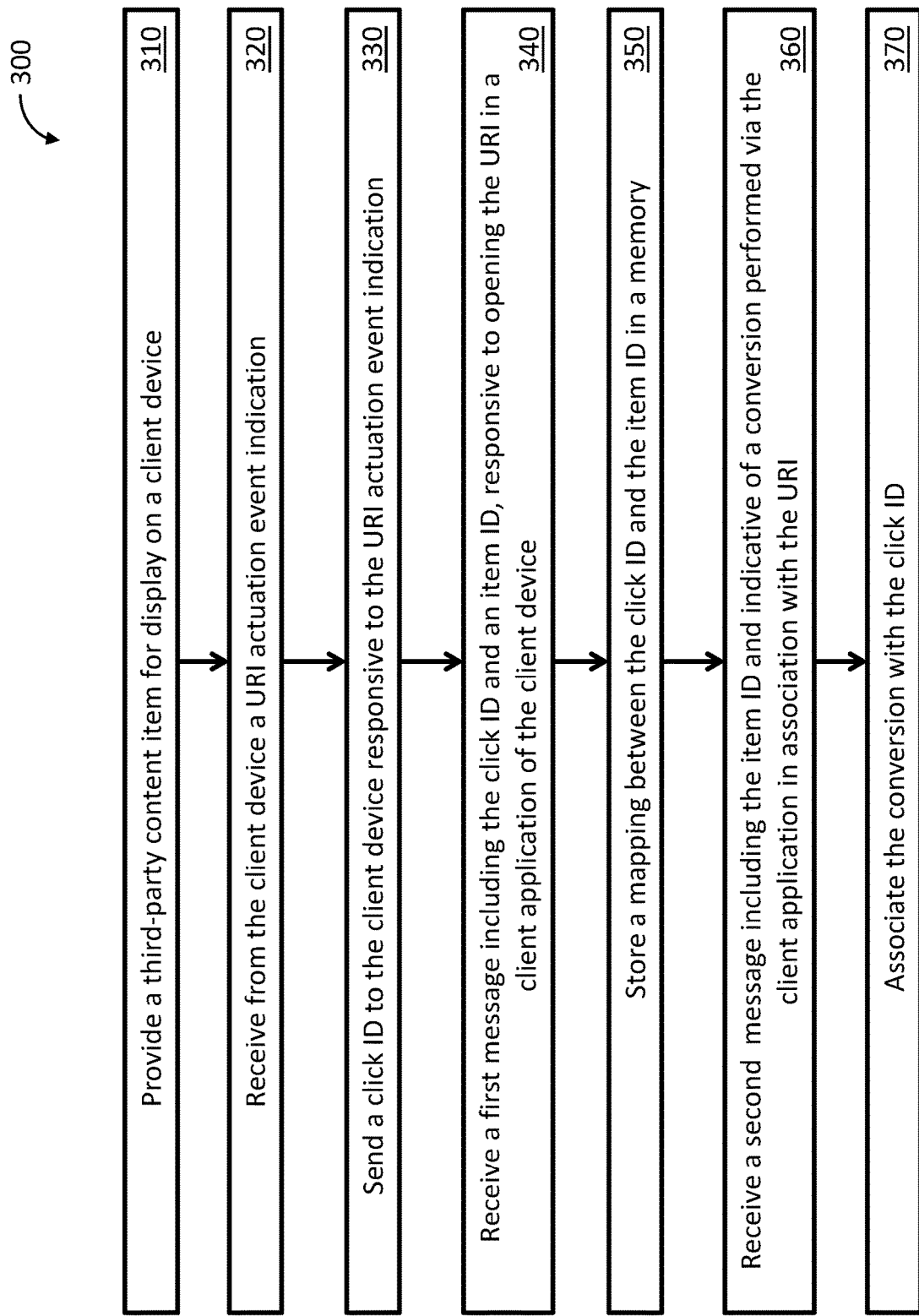
FIG. 3 shows a flowchart illustrating a method 300 of monitoring conversions associated with uniform resource identifiers (URIs) accessed via client applications.

FIG. 3 shows a flowchart illustrating a method 300 of monitoring conversions associated with uniform resource identifiers (URIs) accessed via client applications. The method 300 can include a data processing system providing, via a computer network, a third-party content item for display on a client device (ACT 310), and receiving from the client device a URI actuation event indication (ACT 320). The method 300 can include the data processing system sending a click ID to the client device responsive to receipt of the URI actuation event indication (ACT 330). The method 300 can include the data processing system receiving a first message including the click ID and a client ID, responsive to opening the URI in a client application of the client device (ACT 340), and storing a mapping between the click ID and the client ID in a memory (ACT 350). The method 300 can include the data processing system receiving a second message including the client ID and indicative of a conversion performed via the client application in association with the URI (ACT 360), and associating the conversion, indicated within the second message, with the click ID (ACT 370).

Referring to FIGS. 1-3, the method 300 can include the data processing 110 system providing, via the computer network 101, providing, via a computer network, a third-party content item for display on a client device (ACT 310). The data processing system 110 can receive a request for a third-party content item for presentation on the client device 120. In response to the request, the data processing system 110 can select a third-party content item for sending to the client device 120. The selected third-party content item can include (or be associated with) a URI. In some instances, the data processing system 110 can select a URI for providing with the selected third-party content item. The URI can be, for example, a uniform resource locator (URL) or an address of a landing page. The data processing system 110 can send the third-party content item and the URI to the client device 120 for display thereon by a web browser 123 within an electronic document (e.g., a webpage).

The method 300 can include the data processing 110 system receiving, from the client device 120, a URI actuation event indication (ACT 320). For example, upon the client device 120 actuating the URI on the web browser 123, the client device 120 can send the URI actuation event indication 210 to the data processing system 110. The URI actuation event indication 210 is indicative of the actuation of the URI on the client device 120. The URI actuation event indication 210 can be a request for the content associated with the URI directed to the data processing system 110. The URI actuation event indication 210 can include the actuated URI. Responsive to receiving the URI actuation event indication, the data processing system 110 can assign a click ID to the URI actuation event. The click ID 215 identifies the event of actuating the URI on the client device 120. The click ID 215 can be a number or a string of characters. In some instances, the data processing system 110 can store a mapping between the click ID and the URI in the database 118. In some instances, the data processing system 110 can store a mapping between the click ID and a conversion ID. The conversion ID can be indicative of a type of conversion associated with the URI. The type of conversion can include, for example, an online transaction, download/upload of an electronic file, filling an electronic survey, executing an online donation, actuating an electronic game, playing a video segment, or actuating an icon associated with the content accessible via the URI.

The method 300 can include the data processing system 110 sending the click ID to the client device 120, responsive to receiving the URI actuation event indication (ACT 330). For instance, the data processing system 110 can append the URI with the click ID and send the appended URI to the client device 120. In some instances, the processing system 110 can check the account settings of the third-party content provider associated with the third-party content item and the URI. If a setting parameter "auto-tagging" is enabled, the processing system 110 can automatically append the URI with the click ID. By enabling auto-tagging, a third-party content provider can enable content associated with one or more URIs to be displayed on a respective client application that is installed on client devices 120. In some instances, the processing system 110 can send the click ID to the client device 120 as a separate parameter, for example, within a message. Upon receiving the click ID or the appended URI, the client device 120 can cause the application 125 to display the content associated with the URI. A processor of the client device can check whether the client application 125 is installed on the client device 120 before the web browser 123 forwards the URI to that client application 125. If the client application 125 is not installed on the client device 120, the processor of the client device can cause the content associated with the URI to be displayed on the web browser 123. In some instances, forwarding the URI (e.g., the appended URI) can include the processor of the client device initiating the client application 125 on the client device 120.

The method 300 can include the data processing system 110 receiving a first message including the click ID and an client ID, responsive to opening the URI in a client application 125 (different than the browser 123) of the client device 120 (ACT 340). The client ID can identify the third-party content item provided for display on the client device 120 with the URI. The client application 125 (or one or more SDKs provided by the data processing system 110), when executed by a processor of the client device, can cause the client device 120 to assign the client ID to the third-party content item. The first message 220 can include other parameters, such as an indication of the message type (e.g., connect ping), an indication of the activity type (e.g., deep linking activity in the client application 125), an indication of the SDK(s) version, an indication of whether the process of displaying the content associated with the URI within the client application 125 is a re-try attempt, or a combination thereof. The first message can be formatted as URL.

The SDK(s) (or software module(s)), when executed by the client device 120, can cause the application 125 to send the first message 220 (also referred to as "connect ping") to the data processing system 110 in response to opening the URI within the client application 125. The software module(s), when executed by the processor of the client device, can cause the client device 120 to check if an activity type (e.g., associated with opening the URI within the client application 125) is indicative of a deep linking activity into the client application 125 via a universal link. The software module(s) (or SDK(s)), when executed by the processor of the client device 120, can further cause the client device 120 to extract the click ID 215 from the appended URI, for example, upon determining that the activity is a deep linking activity into the client application 125.

The method 300 can include the data processing system 110 storing a mapping between the click ID and the client ID in a memory (ACT 350). The data processing system 110 can, for example, scan the first message 220 received from the client device 120 and extract parameters therefrom including the click ID and the client ID. The data processing system 110 can store, in the database 118, a data structure (such as a table column/row or a linked list) associating the extracted click ID to the extracted client ID. The data structure can include other parameters extracted from the received first message. Storing the parameters extracted from the first message 220 (including the mapping between the click ID and the client ID) can include the data processing system 110 (or a processor thereof) encrypting the click ID, the client ID, other parameters, or a combination thereof, and storing the encrypted parameter(s). Storing the parameter(s) in encrypted form enhances the security of the system and the privacy of such data. In some instances, scanning the first message can include the data processing system 110 validating the received first message. For instance, the data processing system 110 can check (within the received first message) for the message type and/or one or more other parameters to determine the validity of the received message as a "connect ping." Since conversion messages (for reporting conversion events) employed by third-party content providers usually include the client ID, the mapping (or linking) of the client ID to click ID enables the data processing system 110 to link conversion events (or interaction events) associated with the content of the URI displayed within the client application 125 to the URI actuation event (and therefore to the URI) executed on the client device 120.

The method 300 can include the data processing system 110 receiving a second message including the client ID and indicative of a conversion event performed via the client application in association with the URI (ACT 360). Upon a conversion (or interaction) event occurring within the client application 125 in relation with the content of the URI, the client application 125 (or the SDK(s)) can cause the client device 120 to send a second message (or conversion message) to the data processing system 110. The conversion message 225 can include the client ID, a conversion ID (e.g., indicative of the type of conversion performed within the client application 125), application ID identifying the client application 125 (or a type thereof), conversion transaction information (or parameters such as transaction amount), timestamp indicative of the time of occurrence of the conversion, or a combination thereof.

The method 300 can include the data processing system 110 associating the conversion event responsive to receiving the second message (ACT 370). The data processing system 110 can identify the click ID (or the URI actuation event) associated with conversion event indicated within the second message. For instance, the data processing system 110 can extract the client ID from the second message and determine the corresponding click ID based on the mapping between the client ID and the click ID stored in the database 118. Upon determining the click ID corresponding to the conversion event indicated within the second message, the data processing system 110 can store the conversion parameters (such as the application ID, the timestamp indicative of the conversion occurrence time, and/or the conversion transaction information) received within the second message in the database 118 in association with the determined click ID 215. Identifying (or determining) a click ID corresponding to a received conversion message (such as the second message) can be indicative of a web-to-app conversion. In some instances, if no click ID is determined as corresponding to a received conversion message, then the conversion message can be interpreted, for example, as indicative of a web-to-web conversion.

Based on the determined click ID, the data processing system 110 can also compare the conversion ID received within the second message to the conversion ID mapped to the click ID and stored in the database 118. Based on this comparison, the data processing system 110 can determine the validity (or authenticity) of the second message (or the conversion indicated therein). For example, the data processing system 110 can store the conversion parameters if a match between the conversion ID received within the second message and the conversion ID mapped to the click ID stored within the database 118 is determined. In some instances, the data processing system 110 can update maintained conversion statistics (or performance statistics) associated with the third-party content item, the URI, the client application 125, or the client device 120 based on the information received within the second message.

In some instances, the data processing system 110 can receive the second message via a computer device associated with the third-party content provider (such as the third-party content server 102 or the computing device 202). The data processing system 110 can send, responsive to receipt of the second message, URI actuation event information (such as the click ID, the URI, the conversion ID stored in the database 118, a timestamp indicative of time of actuating the URI on the web browser 123, or a combination thereof). The data processing system 110 can send the URI actuation information in the form of a URL. A template of the URL including the URI actuation information can be pre-defined. Sending the URI actuation information to the computer device associated with the third-party content provider can include identifying a click ID associated with the received second message (as described above), and retrieving, based on the identified click ID, one or more parameters (such as the click ID, the URI, the conversion ID stored in the database 118, a timestamp indicative of time of actuating the URI on the web browser 123, or a combination thereof) from the database 118 for sending to the to the computer device associated with the third-party content provider.

In some instances, the data processing system 110 can receive the second message from the client device 120 (or the web browser 123). The data processing system 110 can be configured to report, responsive to receiving the second message, a combination of conversion parameters (e.g., from the second message) and URI actuation event parameters (e.g., retrieved from the database 118) to a computer device of the third party content provider (such as the third-party content server 102 or the computing device 202). The data processing system 110 can send the combination of conversion parameters and URI actuation event parameters to the computer device of the third party content provider in the form of a URL.

Figure 4:
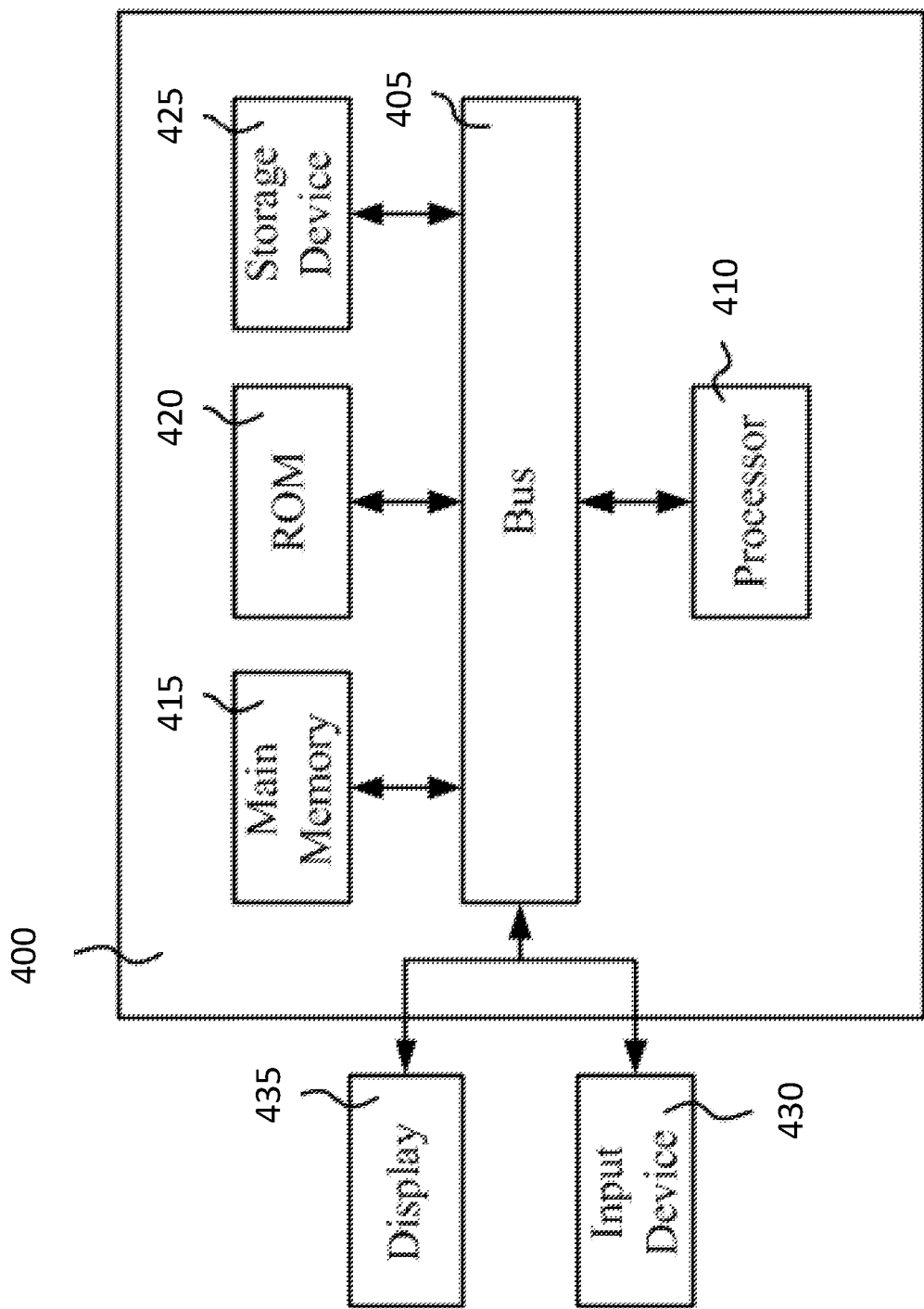
FIG. 4 is a block diagram depicting one implementation of a general architecture for a computer system that may be employed to implement various elements of the systems and methods described and illustrated herein.

FIG. 4 is a block diagram of a computer system 400 that can be used to implement the client device 120, data processing system 110, third-party content server 102, resource server 104, content server 112, click server 114, performance server 116, and other components described herein. The computing system 400 includes a bus 405 or other communication component for communicating information and a processor 410 coupled to the bus 405 for processing information. The computing system 400 can also include one or more processors 410 coupled to the bus for processing information. The computing system 400 also includes main memory 415, such as a RAM or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. Computing device 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes or methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes or method ACTs described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an implementation of a computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Where technical features in the drawings, detailed description or any claim are followed by reference identifiers, the reference identifiers have been included to increase the intelligibility of the drawings, detailed description, and claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to monitor interactions with content associated with uniform resource identifiers (URIs) accessed via client applications, the system comprising:
a data processing system including a memory storing computer code instructions therein and one or more processors to execute the computer code instructions, the computer code instructions when executed by the one or more processors cause the data processing system to:
assign a click identifier (ID) to a first URI by appending the click ID to the first URI to create a second URI responsive to receipt of an indication of a first interaction with the first URI by a web browser of a client device, the second URI including the click ID,
(i) the first URI presented with a third-party content item of a third-party content provider by the web browser of the client device on a web page,
(ii) the click ID identifying the actuation of the first URI by the client device, and
(iii) the actuation of the first URI causing a client application of the client device other than the web browser to display, within the client application, a landing page identified by the first URI, the landing page associated with the third-party content provider;
send the second URI including the appended click ID identifying the first interaction with the first URI by the client device, via a computer network to the client device, responsive to the receipt of the indication of the first interaction with the first URI by the client device;
receive, via the computer network from the client application, and responsive to a second interaction by the client application with the landing page, a message including:
(i) the click ID included in the second URI identifying the first interaction with the first URI by the client device,
(ii) an application identifier (ID) associated with the client application on the client device, and
(iii) a client identifier (ID) associated with the client device; and
update at least one performance parameter associated with the first URI, based on at least one of the application ID or the client ID, responsive to the click ID of the message matching the click ID appended to the first URI.

2. The system of claim 1, wherein the computer code instructions when executed by the one or more processors further cause the data processing system to send, responsive to receipt of the message, information associated with the second interaction to a computing device associated with the third-party content provider.

3. The system of claim 2, wherein the computer code instructions when executed by the one or more processors further cause the data processing system to send the information associated with the second interaction within a uniform resource locator (URL) to the computing device associated with the third-party content provider.

4. The system of claim 1, wherein the computer code instructions when executed by the one or more processors further cause the data processing system to:

check settings associated with the third-party content provider to determine whether display of the landing page identified by the first URI within the client application is enabled; and
append the first URI with the click ID identifying the first interaction with the first URI by the client device upon determining that display of the landing page identified by the first URI within the client application is enabled.

5. The system of claim 1, wherein the computer code instructions when executed by the one or more processors further cause the data processing system to associate the click ID identifying the first interaction with the first URI by the client device with a first conversion identifier (ID) responsive to the receipt of the indication of the first interaction of the first URI by the client device, the first conversion ID indicative of a type of interaction related to the landing page.

6. The system of claim 5, wherein the computer code instructions when executed by the one or more processors further cause the data processing system to:
extract a second conversion ID from the received message, the second conversion ID indicative of a type of the second interaction with the landing page;
compare the first conversion ID to the second conversion ID; and
determine authenticity of the second interaction based on the comparison of the first conversion ID and the second conversion ID.

7. The system of claim 1, wherein the message further includes at least one of:
a conversion identifier (ID) indicative of a type of the second interaction representing the second interaction with the landing page identified by the URI on the client application; or
an indication of a time instant at which the second interaction occurred.

8. The system of claim 1, wherein the computer code instructions when executed by the one or more processors further cause the data processing system to receive the message through a computing device associated with the third-party content provider.

9. A method of monitoring interactions with content associated with uniform resource identifiers (URIs) accessed via client applications, the method comprising:
assigning, by a data processing system, a click identifier (ID) to a first URI by appending the click ID to the first URI to create a second URI responsive to receipt of an indication of a first interaction with the first URI by a web browser of a client device, the second URI including the click ID,
(i) the first URI presented with a third-party content item of a third-party content provider by the web browser of the client device on a web page,
(ii) the click ID identifying the actuation of the first URI by the client device, and
(iii) the actuation of the first URI causing a client application of the client device other than the web browser to display, within the client application, a landing page identified by the first URI, the landing page associated with the third-party content provider;
sending, by the data processing system via the computer network to the client device, the second URI including the appended click ID identifying the first interaction with the first URI by the client device, responsive to the receipt of the indication of the first interaction with the first URI by the client device;

receiving, by the data processing system via the computer network, and responsive to a second interaction by the client application with the landing page, a message including:
- (i) the click ID included in the second URI identifying the actuation of the first interaction with the first URI by the client device,
- (ii) an application identifier (ID) associated with the client application on the client device, and
- (iii) a client identifier (ID) associated with the client device; and updating, by the data processing system, at least one performance parameter associated with the first URI based on at least one of the application ID or the client ID, responsive to the click ID of the message matching the click ID appended to the first URI.

10. The method of claim 9, further comprising sending, responsive to receiving the message, information associated with the second interaction to a computing device associated with the third-party content provider.

11. The method of claim 10, further comprising sending the information associated with the second interaction within a uniform resource locator (URL) to the computing device associated with the third-party content provider.

12. The method of claim 9, further comprising:
checking, by the data processing system, settings associated with the third party content provider to determine whether display of the landing page identified by the first URI within the client application is enabled; and
appending, by the data processing system, the first URI with the click ID identifying the first interaction with the first URI by the client device upon determining that display of the landing page identified by the first URI within the client application is enabled.

13. The method of claim 9 further comprising associating the click ID identifying the first interaction with the first URI by the client device with a first conversion identifier (ID) responsive to the receipt of the indication of the first interaction with the first URI by the client device, the first conversion ID indicative of a type of interaction related to the landing page.

14. The method of claim 13, further comprising:
extracting a second conversion ID from the received message, the conversion ID indicative of a type of the second interaction with the landing page;
comparing the first conversion ID to the second conversion ID; and
determining authenticity of the second interaction based on the comparison of the first conversion ID and the second conversion ID.

15. The method of claim 9, wherein the message further includes at least one of:
a conversion identifier (ID) indicative of a type of the second interaction representing the interaction with the landing page identified by the first URI on the client application; or
an indication of a time instant at which the second interaction occurred.

16. The method of claim 9, further comprising receiving the message through a computing device associated with the third-party content provider.

* * * * *